United States Patent [19]

Cain et al.

[11] Patent Number: 4,732,471

[45] Date of Patent: Mar. 22, 1988

[54] LASER ALIGNMENT SYSTEM WITH MODULATED FIELD

[75] Inventors: Gary L. Cain, Springfield; Sidney B. Goren, Troy, both of Ohio

[73] Assignee: Spectra-Physics, Inc., San Jose, Calif.

[21] Appl. No.: 4,463

[22] Filed: Jan. 20, 1987

Related U.S. Application Data

[63] Continuation of Ser. No. 788,764, Oct. 18, 1985, Pat. No. 4,674,870.

[51] Int. Cl.$^4$ .................. G01B 11/26; G01C 3/08
[52] U.S. Cl. ............................. 356/152; 356/4; 356/400
[58] Field of Search ................. 356/4, 152, 400

[56] References Cited

U.S. PATENT DOCUMENTS

| | | | |
|---|---|---|---|
| 2,796,685 | 6/1957 | Bensinger | 37/143 |
| 3,189,744 | 6/1965 | Ogland | 250/199 |
| 3,452,207 | 6/1969 | Tsukkerman | 250/215 |
| 3,469,919 | 9/1969 | Zellner | 356/4 |
| 3,471,234 | 10/1969 | Studebaker | 356/3 |
| 3,485,546 | 12/1969 | Roth | 350/7 |
| 3,588,249 | 6/1971 | Studebaker | 356/4 |
| 3,656,828 | 4/1972 | Scholdstrom | 350/7 |
| 3,790,277 | 2/1974 | Hogan | 356/141 |
| 3,820,903 | 6/1974 | Kindl et al. | 356/138 |
| 3,894,230 | 7/1975 | Rorden et al. | 356/400 |
| 4,023,908 | 5/1977 | Johnson et al. | 356/4 |
| 4,029,415 | 6/1977 | Johnson | 356/141 |
| 4,040,738 | 8/1977 | Wagner | 356/4 |
| 4,111,564 | 9/1978 | Trice | 356/247 |
| 4,477,168 | 10/1984 | Hosoe | 356/1 |

Primary Examiner—Stephen C. Buczinski
Attorney, Agent, or Firm—Quarles & Brady

[57] ABSTRACT

A laser alignment system includes a transmitter and one or more receivers. The transmitter produces an alignment field by projecting laser energy in a non-planar reference cone, and the receivers locate this reference cone with photodetectors. The laser energy in the alignment field is modulated at 8 KHz and the signals produced by the photodetectors are filtered and amplified to increase the range of the system. Each receiver operates a display which indicates when it is aligned in the reference cone, and it produces an out-of-level indication when the transmitter is not properly aligned.

2 Claims, 10 Drawing Figures

LASER ALIGNMENT SYSTEM WITH MODULATED FIELD

This is a continuation of application Ser. No. 788,764, filed Oct. 18, 1985, now U.S. Pat. No. 4,674,870.

BACKGROUND OF THE INVENTION

The field of the invention is laser-based alignment equipment, and particularly, systems which produce an alignment field using a laser and one or more receivers which detect the field and provide an accurate alignment indication at locations remote from the laser transmitter.

In prior laser-based alignment systems such as that disclosed in U.S. Pat. No. 3,588,249, a columnated laser beam is rotated 360° about an axis to establish an alignment plane. Remote receivers in the vicinity may detect the laser beam as it sweeps past, and provide a visual or audible indication when they are aligned in the laser plane. While this rotating beacon technique provides excellent results over long ranges, the cost of the mechanical and optical structures for implementing the technique with the desired amount of accuracy is relatively high. In addition, the plane is more difficult to locate, as the receiver may be moved through the plane before the beam strikes its detector.

Another technique for producing an alignment plane or cone with a laser is to direct a columnated laser beam at a conical surface. The laser beam is separated by the surface and each portion is reflected directly from the cone at an angle to produce a continuous laser alignment plane or cone which extends radially outward from the conical surface over 360°. While this technique eliminates the need for a rotating mechanism, the laser energy directed in any single direction is only a small fraction of the total beam energy. As a result, the range of the instrument is substantially reduced when used with receivers having the same sensitivity. Of course, the laser beam energy could be increased to offset this loss, but the increased cost, size and energy consumption of the larger laser offsets much of the cost advantage of this technique. Also, government regulations severly limit the energy level of lasers which can be used in the workplace.

When the laser transmitter is employed on a construction site, it is typically mounted on a tripod or other structure which can be precisely adjusted to level the laser plane which it produces. The receivers may be carried by construction workers or mounted on earth moving equipment and used throughout a large area. Such workers or equipment operators must be warned immediately if the laser alignment plane is out of level. This may occur, for example, on windy days, or when large equipment is operated near the laser transmitter.

SUMMARY OF THE INVENTION

The present invention relates to a laser alignment system in which the transmitted laser energy is amplitude modulated to increase the effective range of the system and to enable information to be conveyed to the receivers. The receiver includes a photo detector for converting the modulated laser energy to an electrical signal containing an information component at the modulation frequency, a filter for suppressing electrical signal components other than the information component, an amplifier for amplifying the information component, and means for providing an indication to an operator when the level of the information component reaches a preselected level. In another aspect of the invention the modulated laser energy is pulsed by the transmitter at a present repetition rate when a preselected event occurs, and the receiver includes a detector which senses the pulsations in the modulated laser energy and provides an indication that the event has occurred.

A general object of the invention is to increase the range of a laser alignment system. By modulating the laser energy at a selected frequency, the receiver can be "tuned" to reject radiant energy produced by other sources such as the sun, work lamps, street lights and fires. As a result, the signal-to-noise ratio can be significantly improved and more amplification may be provided at the receiver.

Another object of the invention is to provide a laser alignment system in which operators at each receiver are immediately notified when an event, such as an out-of-level condition, occurs at the transmitter. This is accomplished by sensing the condition at the transmitter and pulsing the modulated laser energy. Each receiver includes a detection circuit which measures the duration of the received pulses of modulated laser energy and produces a visual or audible indication to the operator when the requisite pulse duration is sensed.

A more specific object of the invention is to provide a receiver which will detect the energy center of an alignment laser beam or reference cone. The receiver includes two juxtaposed, tapered photodetectors and two separate channels for filtering and amplifying the signals produced by the modulated laser energy which impinges on each. The peak levels of the two signals are measured and compared, and when they are substantially the same in magnitude, an indication of accurate alignment is produced.

A more specific object of the invention is to increase the range of a laser alignment system without increasing the r.m.s. energy level of the laser. The amplitude modulation of the energy produced by the laser enables its periodic peak value to be increased without increasing the r.m.s. energy level. The receiver employs an auto correlator that includes a peak level detector which is synchronized with the modulation frequency to measure the value of this periodic peak amplitude.

Yet another specific object of the invention is to sense when the transmitter is not properly leveled. This is accomplished by a photodetector which is mounted within the transmitter and which receives reflected energy from the laser. If the transmitter is not level, the reflected laser energy does not strike the photodetector and an out-of-level indication signal is produced.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
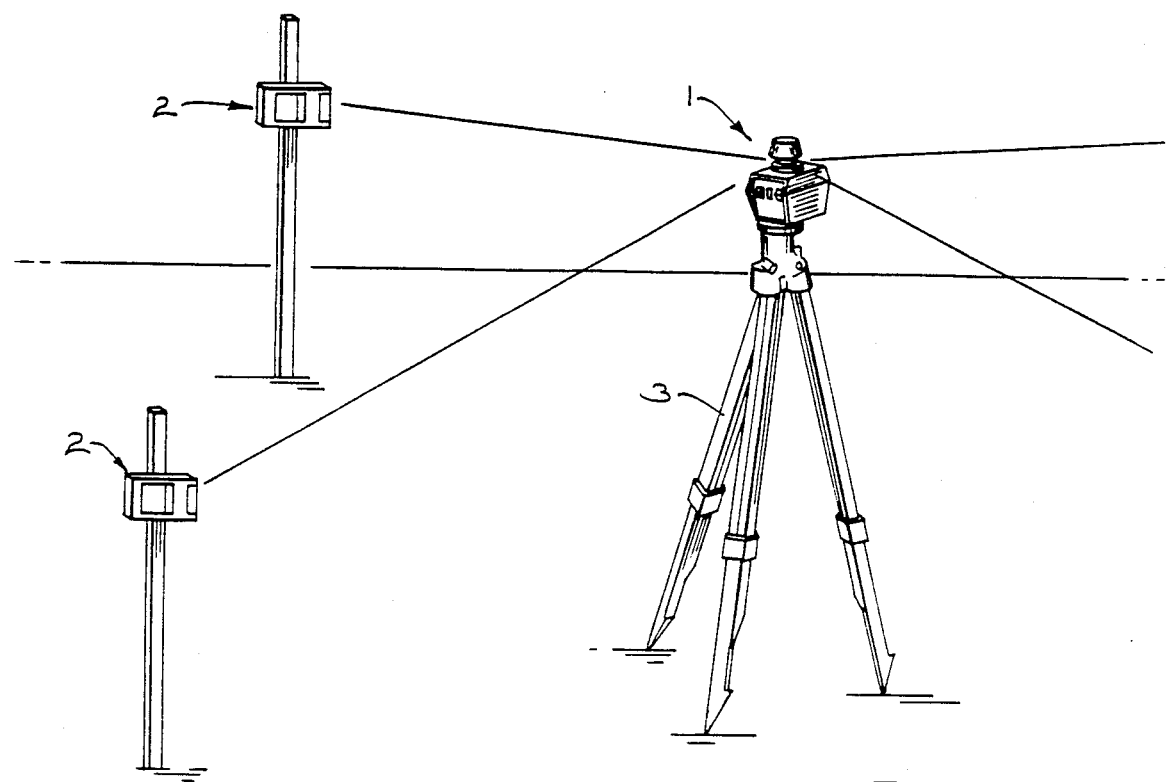
FIG. 1 is a pictoral view of a laser alignment system which employs the present invention.
Figure 2:
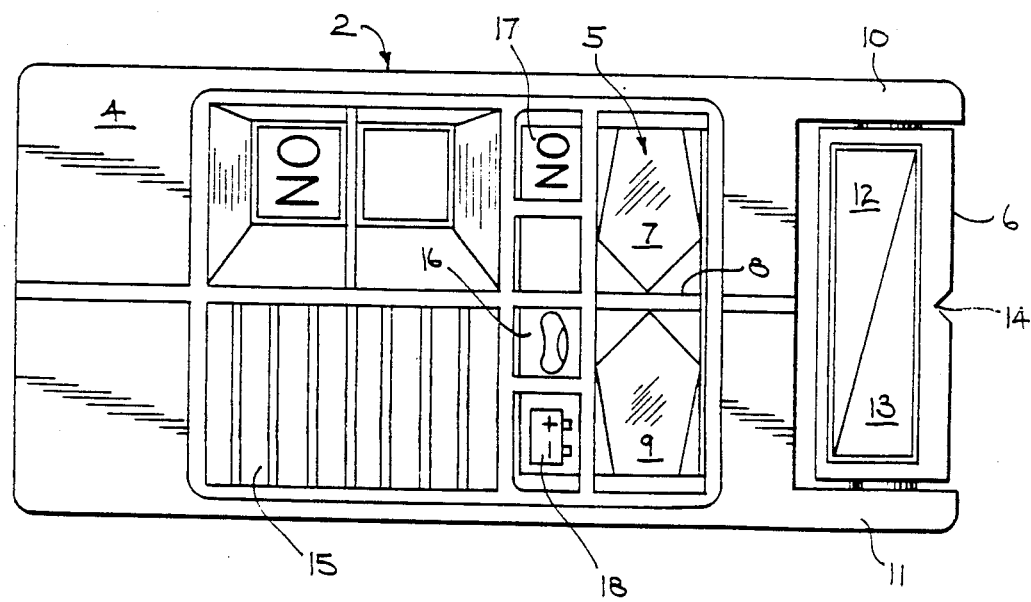
FIG. 2 is a plan view of a receiver employed in the system of FIG. 1.

Referring particularly to FIGS. 1 and 2, the laser alignment system of the present invention includes a transmitter 1 and one or more receivers 2. The transmitter 1 is supported on a rigid structure such as a tripod 3 and the receivers 2 are carried around the construction site and used where needed. The transmitter 1 contains a laser which produces an alignment field in the form of a non-planar reference cone which is formed by emitting coherent radiation radially outward from the transmitter 1 in all directions. When the transmitter 1 is level, this reference cone declines from the horizontal in an amount sufficient so that due to the curvature of the earth each point along the cone is an equal distance from the earth's surface. It has a thickness of approximately five-eights of an inch. For a more detailed description of the mechanical and optical construction of the transmitter 1, reference is made to co-pending U.S. patent application Ser. No. 788,800 filed on even date herewith and entitled "Self Leveling Transmitter for Laser Alignment Systems".

Referring particularly to FIG. 2, the receiver 2 is a relatively small, hand-held device which includes a molded plastic case 4 that supports a liquid crystal display (LCD) 5 and a photodetector module 6. The LCD 5 includes three segments 7-9 which may be separately energized to indicate to the operator that the receiver is positioned either above the reference cone, on the reference cone, or below the reference cone. The photodetector module 6 is rotatably mounted between a pair of arms 10 and 11 so that it can be oriented in a variety of positions to direct a pair of photocells 12 and 13 towards the transmitter 1. The surfaces of the photocells 12 and 13 are tapered to form triangular shaped areas for receiving the energy produced by the transmitter 1. As will be described in more detail below, when a notch 14 in the case 4 is precisely aligned on the reference cone, the signals produced by the two photocells 12 and 13 have the same magnitude. When the receiver 1 is positioned slightly below the reference cone, the signal produced by the upper photocell 12 is greater than that produced by the lower cell 13. When it is raised slightly above the reference cone, the upper cell 12 produces the larger signal. The relative magnitude of these two signals is employed to determine which LCD segment 7-9 is to be energized.

The receiver 2 includes other indicating devices. It includes an audio transducer 15 which emits a sound when the receiver 2 senses energy in the reference cone. A visual indicator 16 is energized when the transmitter indicates that the reference cone is not level. And finally, a visual indicator 17 is energized when the receiver is turned on, and an indicator 18 is energized when the battery voltage drops below a preset value.

Figure 3:
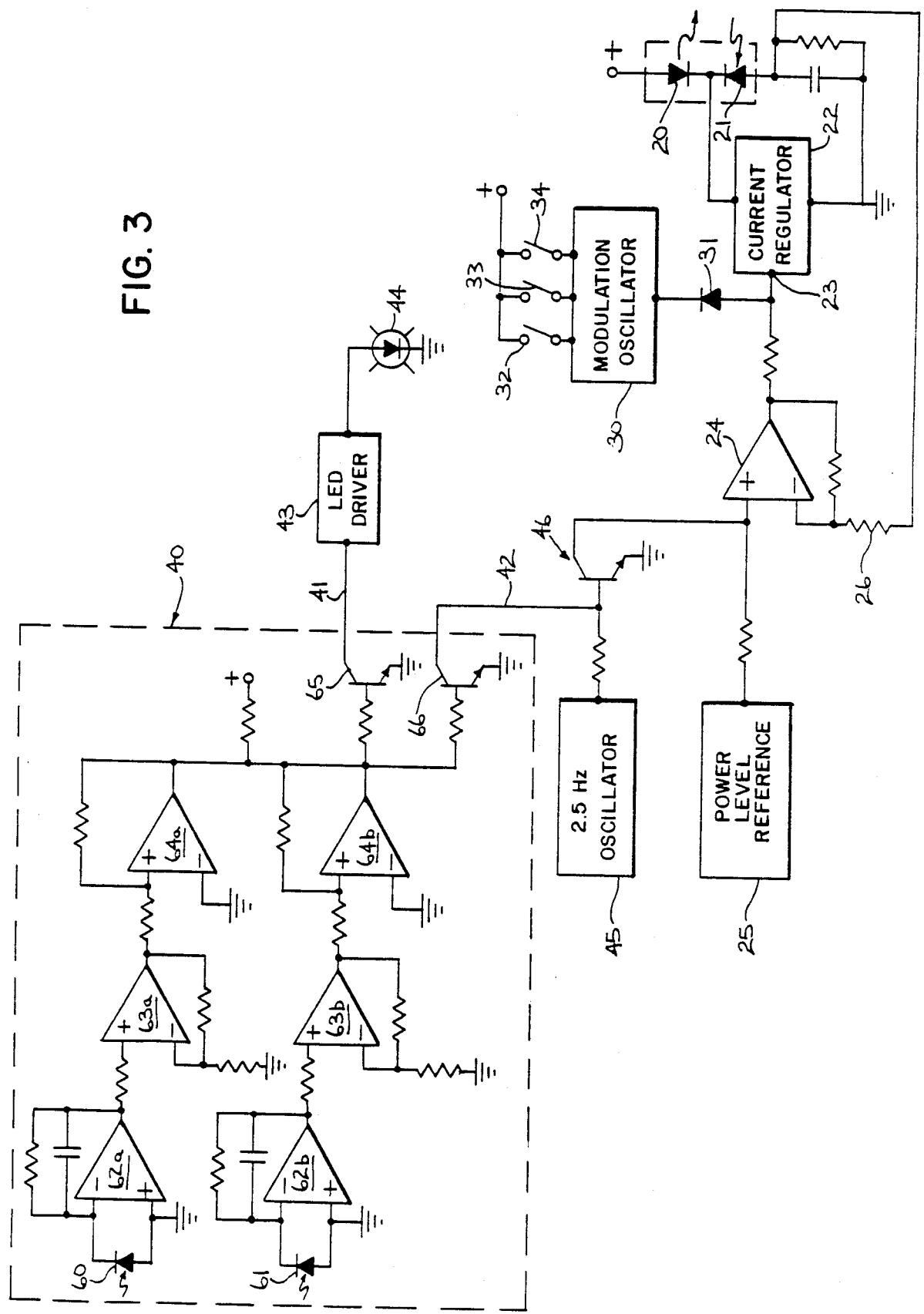
FIG. 3 is an electrical schematic diagram of the transmitter employed in the system of FIG. 1.

Referring particularly to FIG. 3, the transmitter circuit provides current to a laser diode 20 which emits coherent ultraviolet radiation through a series of lenses, reflectors and damping fluid to produce the laser nonplanar reference cone. The laser diode 20 is packaged with a light sensitive diode 21 that is positioned to sense the level of the energy emitted by the laser diode 20. This energy is controlled by a current regulator 22 which connects to the junction of the diodes 20 and 21, and which controls the level of current flowing through the laser diode 20 in response to a current command signal applied to a control terminal 23.

The current regulator 22 forms part of a closed loop power level control circuit which also includes an operational amplifier 24 and a power level reference circuit 25. The power level reference circuit 25 produces a constant reference voltage which is applied to the non-inverting input of the operational amplifier 24 and a feedback voltage indicative of the level of the energy being emitted by the laser diode 20 is applied to the inverting input of the operational amplifier 24. This feedback voltage is produced by the light sensitive diode 21 acting through a feedback resistor 26. The reference voltage produced by the circuit 25 is preset to a value, which when combined with the feedback voltage at the amplifier 24, generates a command signal for the current regulator 22 that results in the desired power level from the laser diode 20. Typically, this power level is set to the maximum r.m.s. power level allowed under the applicable government regulations, and in prior systems, this power is produced continuously.

One aspect of the present invention is to increase the peak power produced by the laser diode 20 without increasing the regulated r.m.s. power level which it produces. This is accomplished by modulating the energy level of the laser diode 20. More specifically, a modulation oscillator 30 is connected to the control terminal 23 on the current regulator 22 through a diode 31. The modulation oscillator 30 produces a square wave voltage waveform which has a fifty percent duty cycle. This modulation waveform alternately turns the current regulator 22 on at its commanded level and fully off. The modulation oscillator 30 produces any one of three frequencies (7.8 kHz, 8.0 kHz, 8.2 kHz) which is selectable by closing one of three switches 32–34. In the following description this modulation frequency will be referred to as 8 kHz, although one of the other two frequencies may be employed in any installation so as not to interfere with other similar transmitters located at the same site.

The primary purpose of the transmitter is to produce an alignment field in the form of a non-planar reference cone. To accomplish this a mechanism is provided which enables the operator to manually adjust the level of the instrument. And, as described in the above-cited copending patent application, once the instrument is brought to within 10 arc minutes of perfect level, an automatic leveling system provides the final adjustment. It is imperative, of course, that this level be maintained at all times, as considerable damage can be done if grading or construction work proceeds in reliance on an alignment which is out-of-level.

While maintenance of level cannot be insured, the present invention does provide an immediate indication of an out-of-level condition. Referring again to FIG. 3, an out-of-level detection circuit 40 is provided at the transmitter 1 and it produces an out-of-level signal on lines 41 and 42 when the transmitter 1 is not within the range of its automatic leveling mechanism. The signal on line 41 is input to a driver circuit 43 which produces a signal suitable for driving a light emitting diode 44. The light emitting diode 44 is energized when an out-of-level condition is sensed and a visual indication is provided to those working in the vicinity of the transmitter 1.

An out-of-level condition is also indicated to operators using the receivers 2. This is accomplished by further modulating the energy produced by the laser diode 20. More specifically, a 2.68 Hertz oscillator 45 is coupled to the non-inverting input of the operational amplifier 24 through a switching transistor 46. When the out-of-level signal is produced on line 42, this square wave is applied to the amplifier 24 to repeatedly turn the current control circuit on and off at the 2.68 Hertz rate. As will be described below, this condition is detected at each receiver 2 and a visual indication is produced.

Referring still to FIG. 3, there are numerous methods for detecting an out-of-level condition. In one preferred embodiment of the invention two photodetector diodes 60 and 61 are mounted within the transmitter 1 and energy emitted by the laser diode 20 is reflected off a conical surface onto them. The conical surface produces a ring of energy which impinges on both diodes 60 and 61 when the transmitter 1 is level. When out-of-level, the conical surface swings relative to the diodes 60 and 61 and the ring of energy moves as well. As a result, one or both of the diodes 60 or 61 does not produce current when an out-of-level condition occurs. For a more detailed description of this aspect of the out-of-level detector, reference is made to the above-cited copending patent application which is incorporated herein by reference.

In a second preferred embodiment of the invention a single photodetector diode 60 is mounted within the transmitter 1 and energy emitted by the laser diode 20 is reflected off a planar surface formed on the bottom of the leveling cone contained therein. When the transmitter is out-of-level, this reflected energy does not strike the surface of the photodetector diode 60 and it does not produce current.

The currents produced by each photodetecting diode 60 and 61 are amplified and filtered by an operational amplifier 62, and are compared with a reference current in operational amplifier 63. When sufficient energy impinges on the diode 60 and 61, the output of the amplifier 63 is a low voltage which is input to an operational amplifier 64. The positive feedback around the amplifier 64 causes it to saturate at the negative power supply voltage. If the outputs of both amplifiers 64a and 64b are low, no base current is provided to a pair of switching transistors 65 and 66 and they are turned off. On the other hand, if insufficient energy impinges on either photodetector diode 60 or 61, the output of its associated operational amplifier 64a or 64b is saturated at a high voltage and base current is supplied to the switching transistors 65 and 66. As a result, out-of-level signals are produced on the lines 41 and 42 and the condition is indicated to the operator as described above. Of course, if only a single photodetector diode 60 is employed, as described above, the circuitry associated with the photodetector diode 61 is not required and the output of operational amplifier 64a is sufficient to operate the switching transistors 65 and 66.

Figure 5:
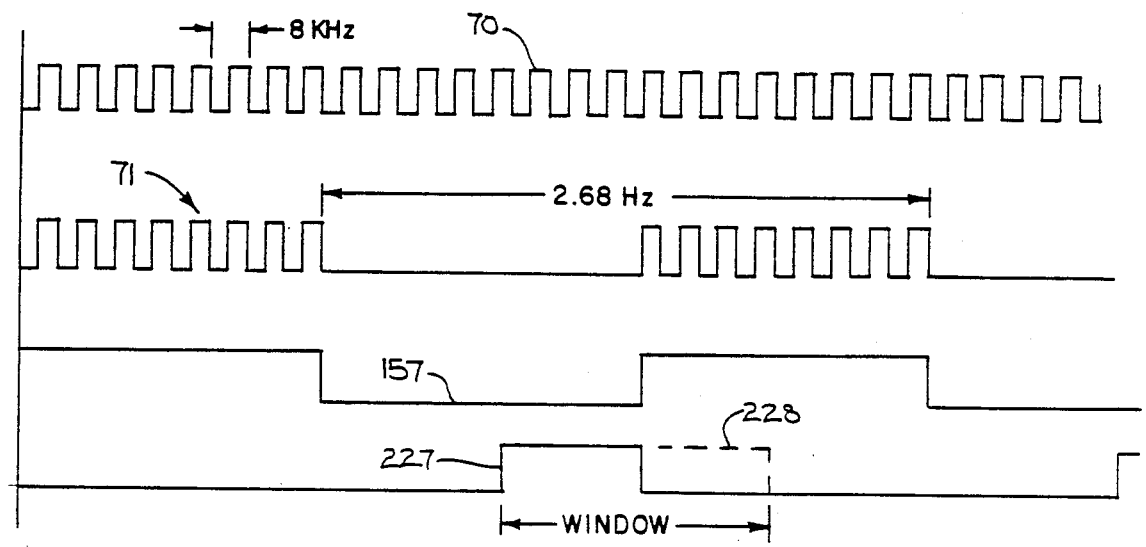
FIG. 5 are graphical representations of signals which are produced in the system of FIG. 1.

Waveforms which illustrate the energy produced by the transmitter 1 are shown in FIG. 5. Waveform 70 illustrates the energy which is produced in the laser alignment reference cone under normal operating conditions, and waveform 71 illustrates the pulsating energy which is produced when an out-of-level condition exists. It should be apparent to those skilled in the art that information other than an out-of-level condition may be encoded into the energy which is projected into the laser alignment reference cone. Also, other techniques may be employed to encode the information.

Figure 4:
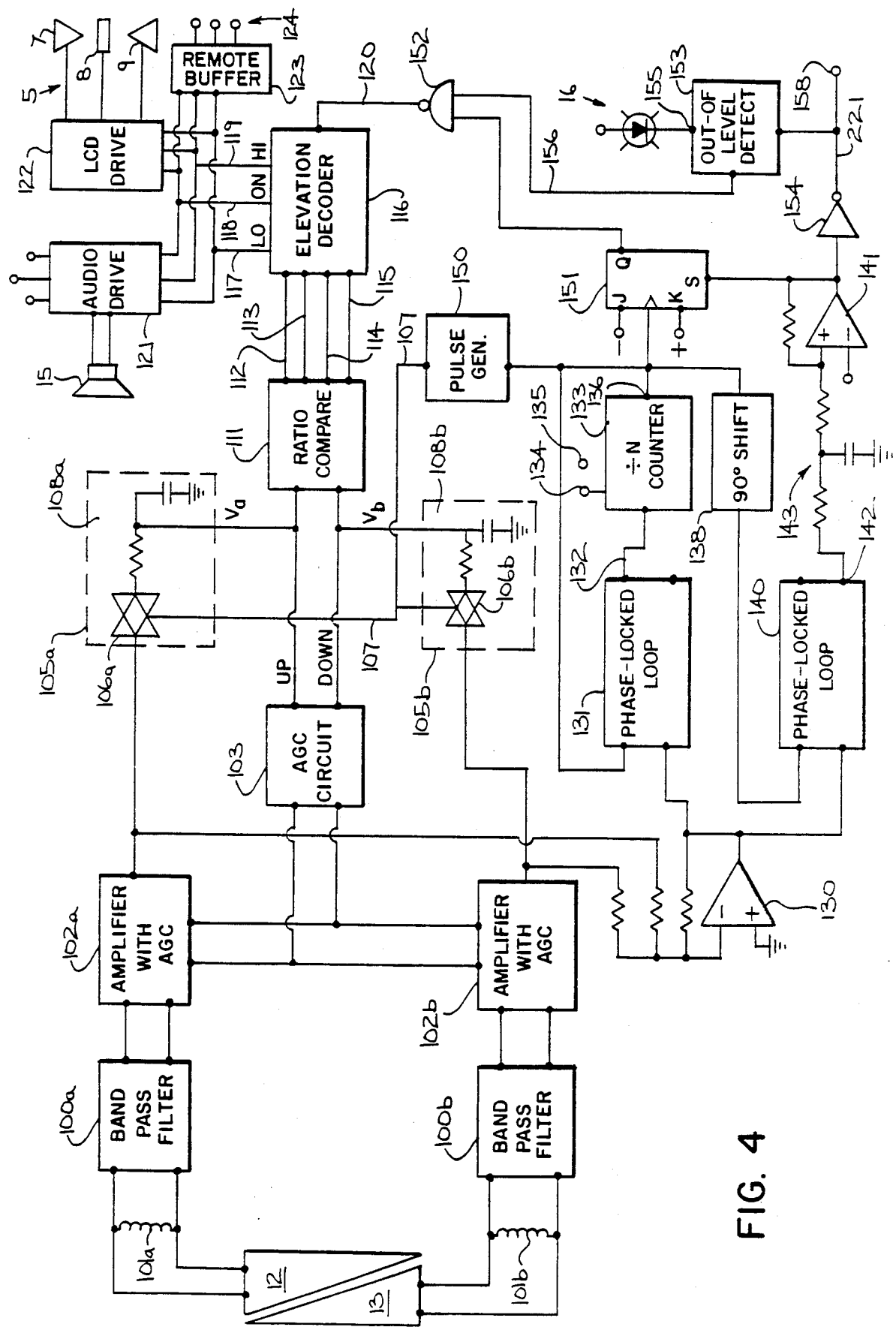
FIG. 4 is an electrical schematic diagram of the receiver employed in the system of FIG. 1.

Referring particularly to FIG. 4, each receiver 2 includes circuitry for detecting and indicating the precise location of the laser alignment reference cone. Separate signal channels are provided for each photocell 12 and 13, and common elements in each will now be described using the same reference numbers. The signal produced by the photocell 12 or 13 is applied to the input of a band pass filter 100. An inductor 101 is connected across the inputs of the band pass filter 100, and it provides a low impedance path which shunts the d.c. and low frequency a.c. components of the input signal. The band pass filter 100 passes a narrow band of signal components centered about the 8 kHz modulation frequency. It also provides amplification for those signal components, and as a result, signals produced by ambient light and by noise energy are substantially reduced relative to the signal produced by the energy in the alignment reference cone.

The output of the band pass filter 100 is applied to an amplifier 102. Because the receivers 2 may be used at various distances from the transmitter 1, the strength of the signal produced by the modulated laser energy will vary considerably. Accordingly, the gain of the amplifier 102 may be switched automatically by an automatic gain circuit (AGC) 103 to provide the appropriate amount of amplification. As shown by the waveform 104 in FIG. 6, the output of the amplifier 102 is a voltage which swings between zero volts and a positive voltage at the modulation frequency. The magnitude of the positive voltage is proportional to the laser energy which impinges the photocell 12 or 13. The gain of the amplifier 102 is adjusted to prevent it from being driven into saturation.

Figure 6:
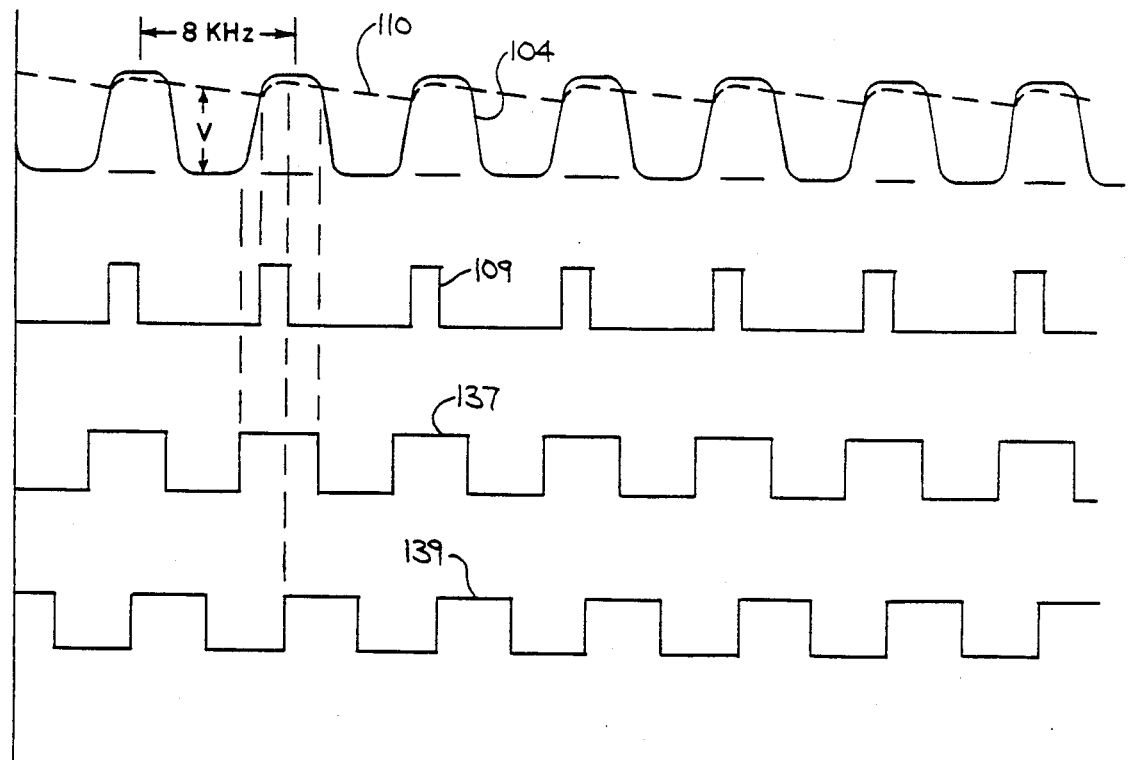
FIG. 6 are graphical representations of signals which are produced in the receiver of FIG. 4.

Referring again to FIG. 4, the output of the amplifier 102 is applied to an auto correlator circuit which is indicated by the dashed line 105. The auto correlator 105 includes an analog switch 106 which is turned on in synchronism with the 8 kHz signal by logic signals received through a control line 107. As a result, the level of the 8 kHz signal is sampled at its peak value. An RC filter 108 at the output of the switch 106 maintains a relatively uniform voltage level (V) which follows the sampled value of the 8 kHz signal. The control signal which synchronously operates the analog switches 106 is shown in FIG. 6 as the waveform 109, and the output of the auto correlator 105 is indicated by the dashed line 110.

As will be described in more detail below, the voltage levels Va and Vb at the outputs of the auto correlators 105a and 105b are applied to the AGC circuit 103 where they are summed and employed to determine the gain required at the amplifiers 102a and 102b. These same signals, Va and Vb, are also applied to the inputs of a ratio comparator circuit 111 where their relative magnitudes are compared.

The ratio comparator 111 determines the position of the receiver 2 relative to the laser alignment reference cone and produces a corresponding logic level signal on one of four output lines 112–115. These signals are applied to an elevation decoder 116 which converts them to logic level signals that indicate whether the receiver 2 is below the alignment reference cone (LO), at the level of the alignment reference cone (ON); or above the alignment reference cone (HI). These signals are produced at respective outputs 117–119 when an enable signal is received on a control line 120.

The three elevation decoder output signals (LO, ON and HI) are applied to an audio driver circuit 121, an LCD driver circuit 122 and a set of three remote buffers 123. The audio driver circuit 121 receives three audio signals having different frequencies, and one of these is applied to the audio transducer 15 in response to the respective signals LO, ON and HI. Similarly, the LCD driver 122 energizes one of the LCD display elements 7, 8 or 9 in response to these same signals, and the remote buffers 123 condition the signals so that they can be sent over conductors 124 to a remotely located indicator module.

It should be apparent that many other methods and devices may be employed to indicate the position of the receiver 2 and to assist the operator in finding the center of the alignment reference cone. In addition, the signals produced by the elevation decoder 116 may be employed as part of a servo-mechanism which automatically maintains the receiver 2 in the laser alignment reference cone and which automatically controls the level of a blade or other earth moving implement on construction equipment.

Referring still to FIG. 4, the receiver 2 does not indicate the presence of the laser alignment reference cone until it senses and "locks" on the 8 kHz signal produced at the output of the amplifiers 102a and 102b. To accomplish this these signals are coupled to the input of an operational amplifier 130 where they are summed and input to a phase-locked loop circuit 131. When in its free-running state the phase-locked loop 131 produces a 500 kHz signal at its output 132 and this is reduced to an 8 kHz signal by a counter 133 which operates as a divider. The counter 133 may also be changed by grounding either of two terminals 134 or 135 such that the frequency at its output 136 is set to 7.8 kHz or 8.2 kHz to accommodate transmitters which are operated at these alternative modulation frequencies.

The output of the counter 133 is fed back to a comparitor input on the phase-locked loop 131, and when the input signal from the operational amplifier 130 has the same frequency, and phase, the phase-locked loop 131 locks onto the input signal and produces a corresponding, synchronized signal at the counter output 136. This synchronized signal is indicated as waveform 137 in FIG. 6 and it is applied to a phase shift circuit 138 which produces a similar waveform 139 that is shifted 90 degrees in phase.

The phase shift circuit 138 forms part of a quadrature detect system that also includes a second phase-locked loop 140 and an operational amplifier 141. The output of the phase shift circuit 138 is compared with the received signal from the operational amplifier 130, and a voltage is produced at an output 142 on the phase-locked loop 140 which is proportional to their instantaneous phase difference. This voltage is zero when the signals are in phase, and it is a maximum when the signals are 90 degrees out of phase. When the voltage output is at a maximum, it is an indication that the first phase-locked loop 131 has locked onto the 8 kHz signal produced by the modulated laser energy. The operational amplifier 141 operates as a voltage comparator which produces a logic high "lock" signal when this occurs. The output of the phase-locked loop 140 is averaged by an RC filter 143 at the input of the operational amplifier 141 to prevent momentary signals from producing a lock indication.

When the phase-locked loop 131 is locked onto the 8 kHz signal, the output of the counter 133 is applied to a pulse generator 150 and it produces the control signal on the line 107 which synchronously operates the analog switches 106a and 106b. The "lock" signal produced by the operational amplifier 141 is applied to the set terminal on a J-K flip-flop 151, which is set and produces the enable signal for the elevation decoder 116 through a NAND gate 152. Thus, when the 8 kHz signal is detected, the phase-locked loop 131 begins producing a synchronous signal which is used by the pulse generator 150 to properly operate the synchronous level detectors 105a and 105b. Thus, by the time the "lock" signal is produced and the elevation decoder 116 enabled, accurate position information is available for display.

When the 8 kHz signal is lost, the phase-locked loop 131 becomes free running and the logic high "lock" signal produced by the operational amplifier 141 is terminated. The J-K flip-flop 151 is reset by the next pulse which appears at the output of the counter 133, and the elevation decoder 116 is disabled so that no further audio or visual indications are provided. This free running state continues until the 8 kHz modulation frequency is again detected in the signals produced by the amplifiers 102a and 102b.

The "lock" signal produced by the quadrature detect circuit also serves as the input to an out-of-level detector 153 and it is applied to a remote indicator module through a line 158. The "lock" signal is inverted by a gate 154 and is employed to detect when the 8 kHz alignment plane laser energy is being pulsed at the 2.68 Hz rate. As explained above, this indicates that the transmitter 1 is out-of-level and that the alignment information should not be used. When this occurs an output 155 on the out-of-level detector 153 is driven low and the out-of-level indicator 16 is thereby energized to warn the operator of the condition. In addition, the NAND gate 152 is disabled through a control line 156 so that the elevation decoder 116 and the indicating devices which it controls are rendered inoperable for the duration of the out-of-level condition.

The "lock" signal which indicates the out-of-level condition is shown as waveform 157 in FIG. 5. As will be described in detail below, two consecutive out-of-lock indications of the proper duration are required to signal an out-of-level condition. The condition terminates whenever the receiver 2 locks or unlocks for a period longer than two consecutive 2.68 Hz cycles.

Figure 7:
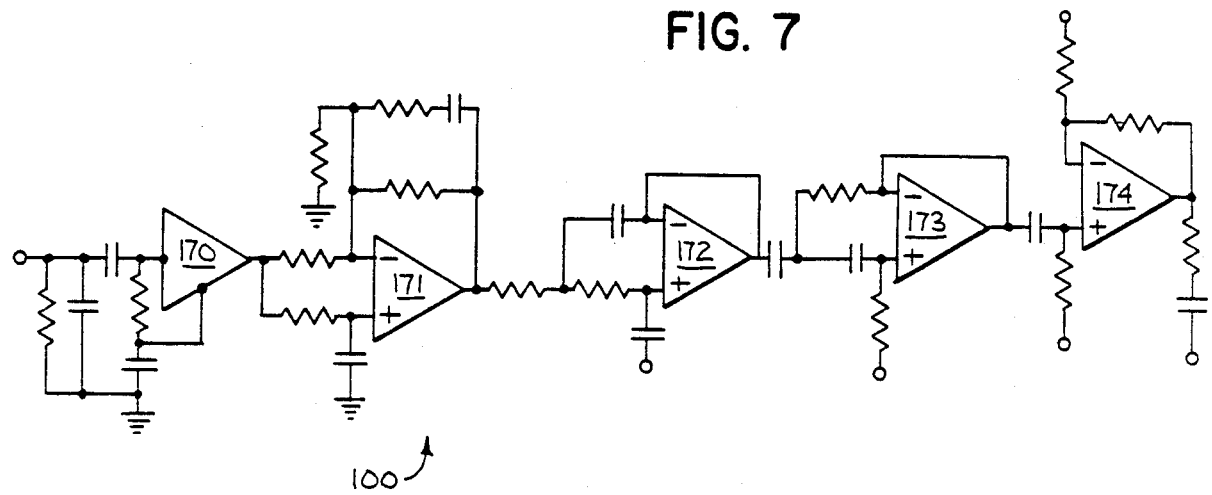
FIG. 7 is an electrical schematic diagram of the band pass filter which forms part of the receiver of FIG. 4.

Referring particularly to FIGS. 4 and 7, the band pass filter circuit 100 is comprised of five operational amplifiers 170–174 which are commercially available in integrated circuit form. The amplifier 170 operates as a pre-amplifier with a frequency response in the range from 200 to 20,000 Hertz and a gain at the 8 kHz modulation frequency of 25. The amplifier 171 is a low pass filter with a cut off frequency of 9 kHz, and the amplifier 172 is a high pass filter which has a cut off frequency of 5.7 kHz. The amplifier 173 is connected as a high pass filter with a cut off frequency of 4.3 kHz, and the amplifier 174 provides a gain of two to the narrow band of frequencies about the 8 kHz modulation frequency.

It should be apparent that numerous circuits for providing amplification and band pass filtering in the audio frequency range are known to the art. The choice of an 8 kHz modulation frequency is not, however, so apparent. It has been discovered that many fluorescent lights found in the work place and used outdoors produce light energy which is modulated in amplitude. The magnitude of this modulated ambient light begins to drop off rapidly at approximately 4 kHz and is relatively insignificant at 8 kHz. In addition, 8 kHz is well within the frequency range of low cost and readily available linear integrated circuit components.

Figure 8:
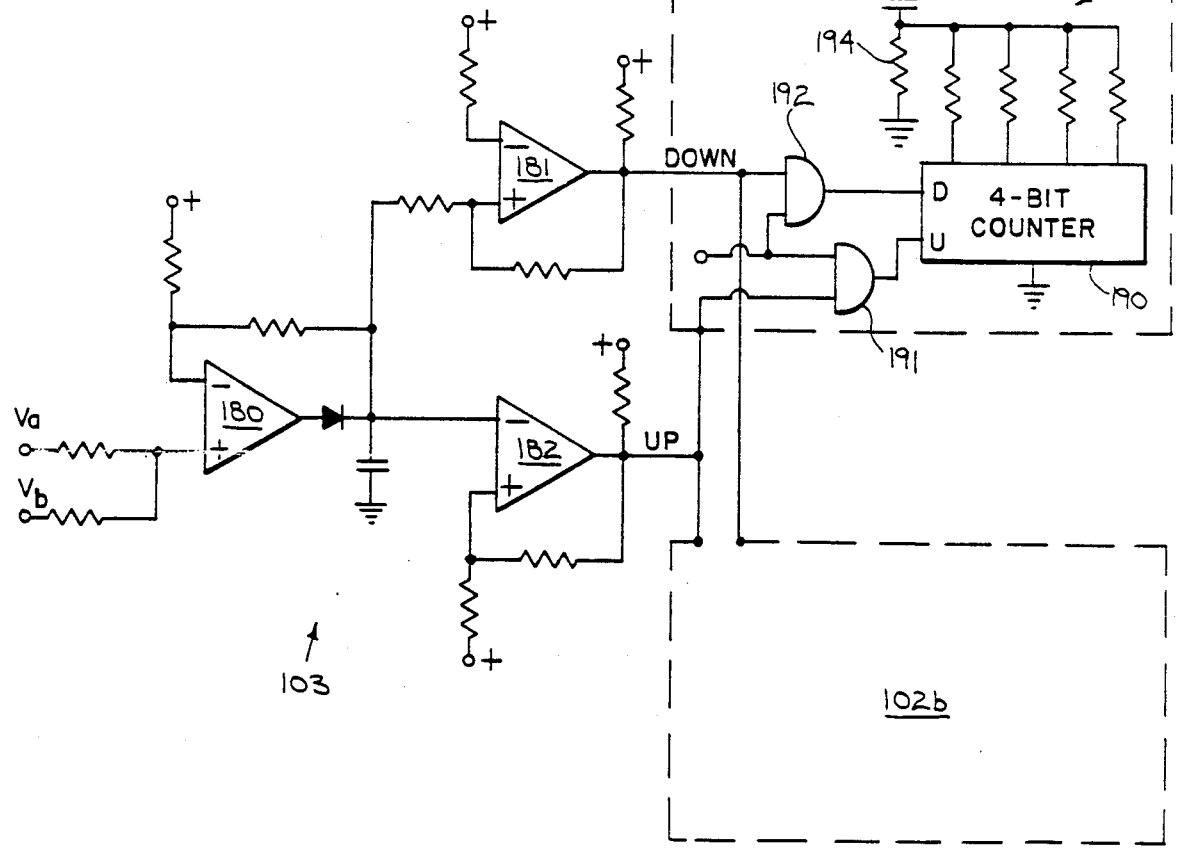
FIG. 8 is an electrical schematic diagram of the amplifier and AGC circuits which form part of the receiver of FIG. 4.

Referring particularly to FIGS. 4 and 8, the AGC circuit 103 is constructed around three operational amplifiers 180-182. The amplifier 180 operates to sum the two signals Va and Vb which are output by the level detectors 105a and 105b. If the sum of these signals is less than 0.48 volts, the output of operational amplifier 182 rises to a logic high voltage, and if their sum is greater than 1.2 volts, the output of operational amplifier 181 rises to a logic high voltage. The output of amplifier 182 drives an UP count line which decreases the gain of the amplifiers 102a and 102b, and the output of amplifier 181 drives a DOWN count line which increases the gain of the amplifiers 102a and 102b.

Referring still to FIG. 8, the amplifiers 102a and 102b each include a 4-bit up/down binary counter 190 which is driven by the UP and DOWN control lines through respective NAND gates 191 and 192. The counter 190 connects to a set of four resistors 193 which are connected in parallel with a gain resistor 194. The gain resistor 194 operates in combination with a feedback resistor 195 to determine the gain of an operational amplifier 196. When the counter 190 is at its maximum count, the gain of the amplifier 102 is at its minimum of one. The counter 190 may be counted down in sixteen steps to progressively add the resistors 193 in parallel with the resistor 194 and to thereby progressively increase the gain to its maximum. The counter 190 is counted up or down in synchronism with a 500 Hz clock signal applied to the AND gates 191 and 192.

Figure 9:
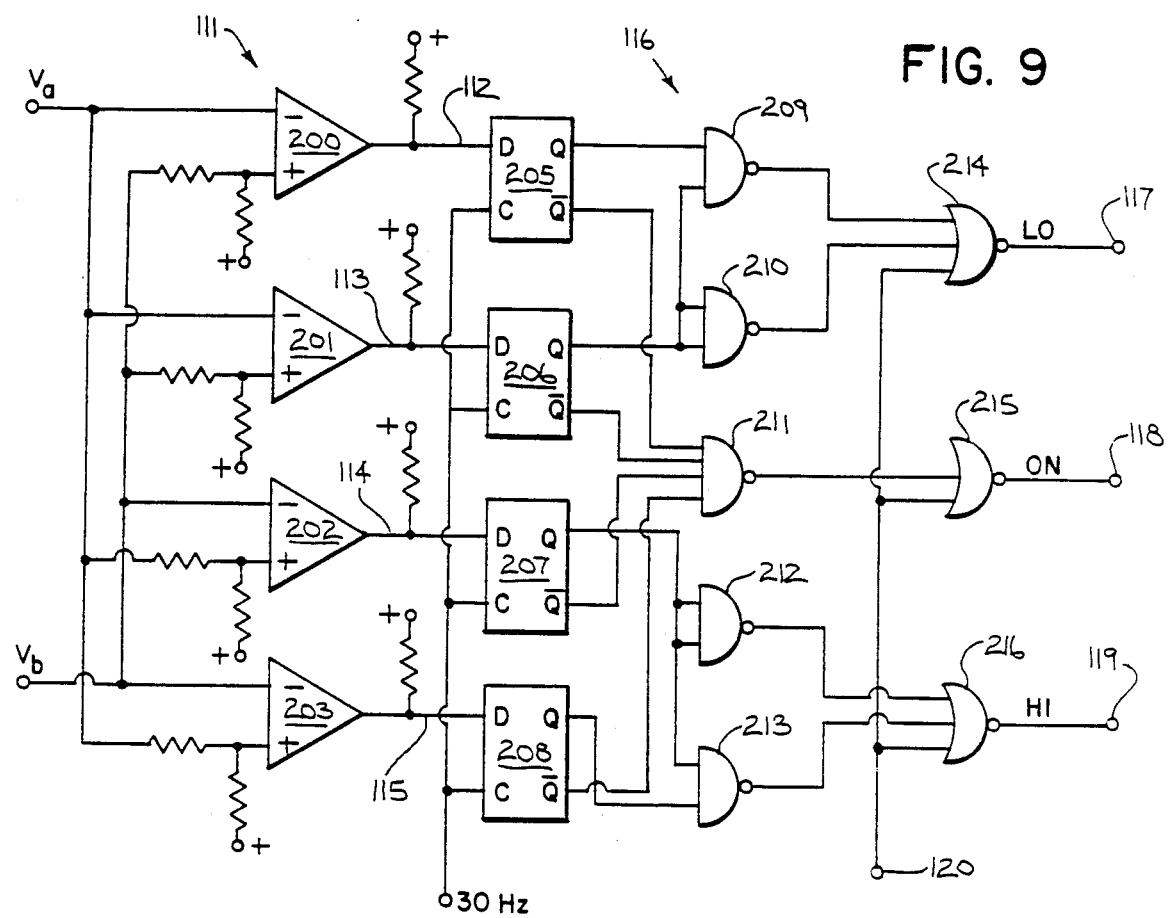
FIG. 9 is an electrical schematic diagram of the ratio compare and elevation decoder circuits which form part of the receiver of FIG. 4.

Referring particularly to FIGS. 4 and 9, the ratio comparator 111 is formed around four operational amplifiers 200-203 which are connected to receive the respective signals Va and Vb at their differential inputs. The amplifiers 200-203 are operated as voltage comparators and the values of the resistor networks connected to their non-inverting inputs establishes the ratio of the input voltages Va/Vb which will cause them to switch state. When the voltages Va and Vb are substantially the same, the outputs of all the amplifiers are saturated at a logic low voltage. As the magnitude of voltage Va becomes less than Vb, a first threshold is reached (Va/Vb=0.866) at which the output 113 of operational amplifier 201 is driven to a logic high voltage. If the ratio Va/Vb continues to decrease, a second threshold is reached (Va/Vb=0.75) at which the output 112 of operational amplifier 200 is driven to a logic high voltage. Similarly, if the magnitude of voltage Va increases above that of Vb, first the output 114 of amplifier 202 rises to a logic high voltage (Va/Vb=1.133) and then the output 115 of amplifier 203 rises (Va/Vb=1.25).

The signals produced on the outputs 112-115 are clocked into four D-type flip-flops 205-208 in the elevation decoder 116. A 30 Hz clock is employed for this purpose. A set of five NAND gates 209-213 connect to the outputs of the flip-flop flops 205-208 and their outputs are combined by a set of three NOR gates 214-216 to produce the three output signals "LO", "ON" and "HI". These three output signals are gated onto the lines 117-119 when the enable line 120 is at a logic high voltage as described above.

It should be apparent that although the preferred embodiment of the receiver 2 provides only a three-state indication of position relative to the laser alignment plane, five-state position information is available at the output of the NAND gates 209-213. This additional information may be useful, for example, where the receiver 2 is used in connection with a servomechanism for controlling the elevation of an excavator blade or the like.

Figure 10:
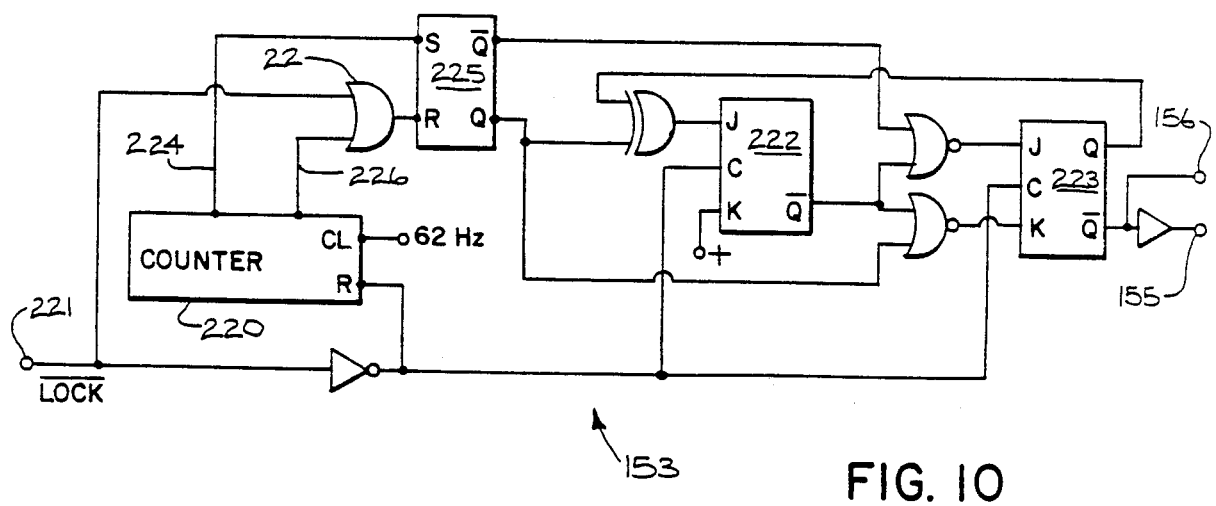
FIG. 10 is an electrical schematic diagram of the out-of-level detector which forms part of the receiver of FIG. 4.

Referring particularly to FIGS. 4 and 10, the out-of-level detector 153 includes a counter 220 which is reset each time the 8 kHz modulated laser energy is lost. As described above, this condition is indicated by the LOCK signal on line 221. The inversion of this signal is also employed to clock two J-K flip-flops 222 and 223 when the 8 kHz signal is again detected. The counter 220 is advanced by a 62 Hz clock signal, and at 100 milliseconds after termination of the 8 kHz signal, a first output 224 goes to a logic high to set an R-S flip-flop 225. The flip-flop 225 is reset 170 milliseconds later when an output 226 on the counter 220 goes to a logic high. The counter 220 operates in combination with the flip-flop 225 to define a time window which lasts from 100 to 270 milliseconds after the 8 kHz signal is lost. If the 8 kHz signal is re-established during this time window an out-of-level condition may be indicated. This event is clocked into the J-K flip-flop 222, and if the same sequence repeats after the 8 kHz signal is again lost, then the J-K flip-flop 223 is set and an out-of-level condition is indicated at the outputs 155 and 156. The operation of the R-S flip-flop 225 is illustrated in FIG. 5. The waveform indicated by the solid line 227 shows the R-S flip-flop 225 when it is reset by the "lock" signal 157, and the dashed line 228 indicates the total extent of the window.

The out-of-level condition is maintained as long as the 8 kHz signal is received and lost at the 2.68 Hz rate. If this rate is not maintained during one cycle, the J-K flip-flop 222 is reset, but the J-K flip-flop remains set and the out-of-level indication is maintained. However, if the rate is lost for two consecutive 2.68 Hz cycles, then the J-K flip-flop 223 is also reset and the out-of-level indication is terminated.

It should be apparent to those skilled in the art that many of the discrete circuit components disclosed herein may be implemented as a custom or semi-custom integrated circuit, or the functions which they perform may be implemented with a properly programmed microcomputer. These and other variations are possible without departing from the spirit of the invention which is defined in the following claims.

We claim:

1. In a laser alignment system having a transmitter for producing an alignment field in the form of energy directed from a laser and a remotely located receiver for detecting the presence of the alignment field and producing an electrical signal proportional to the magnitude of the laser energy, the improvement therein comprising:

modulation means at the transmitter for turning the laser on and off at a modulation frequency, the modulation means including means for selecting one of a plurality of modulation frequencies such that the transmitter may be operated in the same region as another similar transmitter but at a different one of said plurality of modulation frequencies than said other similar transmitter;

a band pass filter at the receiver for suppressing components in said electrical signal at frequencies other than said modulation frequency;

level detector means for receiving the filtered electrical signal and producing a level signal indicative of the magnitude of the modulation frequency signal component therein; and indicator means coupled to the level detector means for providing an indication to a user when the magnitude of the level signal reaches a present value.

2. In a laser alignment system having a transmitter for producing an alignment field in the form of energy directed from a laser and a remotely located receiver for detecting the presence of the alignment field and producing an electrical signal proportional to the magnitude of the laser energy, the improvement therein comprising:

modulation means at the transmitter for turning the laser on and off at a modulation frequency;

a band pass filter at the receiver for suppressing components in said electrical signal at frequencies other than said modulation frequency;

level detector means for receiving the filtered electrical signal and producing a level signal indicative of the magnitude of the modulation frequency signal component therein, the level detector means including means for manually changing the frequency of the modulation frequency signal component for which it produces said level signal, whereby the receiver can be manually changed to detect the presence of another transmitter operating at another modulation frequency; and indicator means coupled to the level detector means for providing an indication to a user when the magnitude of the level signal reaches a preset value.

* * * * *